A. Wyckoff,

Hollow Auger,

No. 2,204, Reissued Mar. 13, 1866.

Witnesses,
C. F. Clayton
L. A. Murphy

Inventor,
Ascalus Wyckoff.
by
D. P. Holloway & Co
his Attorneys.

AM. PHOTO-LITHO. CO. N.Y. (OSBORNE'S PROCESS)

UNITED STATES PATENT OFFICE.

ARCALOUS WYCKOFF, OF ELMIRA, NEW YORK.

IMPROVEMENT IN HOLLOW AUGERS.

Specification forming part of Letters Patent No. 24,773, dated July 12, 1859; Reissue No. 2,204, dated March 13, 1866.

*To all whom it may concern:*

Be it known that I, ARCALOUS WYCKOFF, of Elmira, in the county of Chemung and State of New York, have invented certain new and useful Improvements in the Construction of Annular Augers; and I do hereby declare that the following is a full, clear, and exact description of the same, reference being had to the annexed drawings, made part of this specification, in which—

Figure 1:
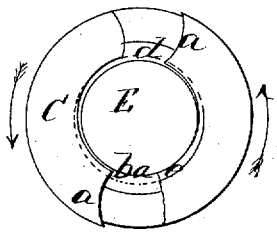
Figure 2:
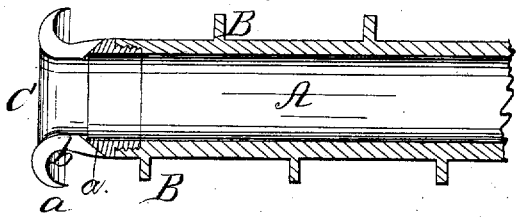
Figure 4:
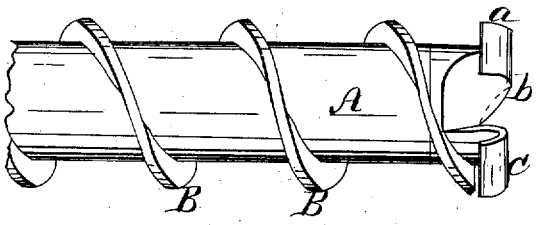
Figure 3:
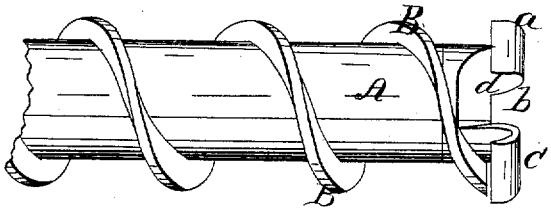

Figure 1 is an end elevation. Fig. 2 is a longitudinal section. Fig. 3 is a side elevation. Fig. 4 is a side elevation showing the auger when the transverse auxiliary cutter is carried diagonally from the prime cutter to the base of the preceding one.

In the several figures the same letters refer to identical parts.

My invention relates to that class of augers which in boring remove only a portion of the wood, leaving an external shell and internal core.

As these augers are intended for boring pieces of considerable length, it is essential that they shall be so directed and controlled as that they shall bore in a direct line, that they shall cut rapidly, that only the cutting points or edges shall come in contact with either the core or shell, as otherwise the machinery will be greatly retarded by friction, that the width of the cut shall be sufficient to permit a spiral rib to be placed around the cylindrical stock to carry away the cuttings, and that the ends of the cylinder shall be beveled between the cutters so as to direct the cuttings over the external surface of the cylinder.

Various attempts have been made to make a good annular auger, but all have failed by encountering some of the difficulties above indicated. I have accomplished every required end by the following means:

A is a hollow cylindrical stock, suppporting the cutter-head, which is firmly attached to a lathe, so as to maintain a right line when boring. Around this stock is wound a spiral rib or flange, B, which forms a conveyer for the cuttings. C is the cutter-head, made of steel, and securely attached to the stock. It is to the construction of this cutter-head that my improvements relate.

In this specification, whenever I use the term "stock" I intend to signify all that part of the auger which lies back of the base of the cutters, having a uniform external surface, except as to the spiral flange and beveled edge.

The cutters may be made of a great variety of forms, and I do not confine my claim to the precise form shown, and which I will proceed to describe.

*a a* are cutting-lips, attached to the cylinder and folded back in a volute form, the interior surface being a concave, and having the outer cutting-edges at a distance from the cylinder slightly greater than the diameter of the spiral rib B, so that there shall be no friction of these ribs against the shell, and the internal set of these cutters must be such that they shall cut the core a little less than the internal diameter of the cylinder.

In constructing these cutters I give such a slope to the sides of cutters that only the cutting-points shall come into contact with the timber, the heels being in the case shown set so that the interior side falls without the circle described by the internal cutting-edge, and the exterior one within the circle described by the exterior cutting-edge. By this arrangement of the parts I free the auger from that friction which has been fatal to every attempt that has heretofore been made to construct an annular auger that could be successfully operated.

I make the edge *b* of the cutter sharp. In the drawings, this portion of the cutter is represented as running longitudinally with the auger. It may be made oblique. The edge of the cylinder between the cutters is beveled to a sharp edge, as shown at *d*. If this part is finished with a cutting-edge it will fit close to the core and cut away all the ragged particles left by the prime cutter *a*, and the enlargement in the throat will occur immediately behind this cutting-edge. It is not necessary that this part should be finished to a cutting-edge. It is, however, essential that the space between the cutters should be thus finished to a beveled edge next the core, so that the cuttings may be directed outward over the external face of the cylinder.

Having fully explained the nature of my improvements, what I claim as my invention, and seek to secure by Letters Patent, is—

1. In an annular auger, in combination with a prime cutter, *a*, a transverse auxiliary cutter, *b*, carried back to the extremity of the stock, either longitudinally with the auger, or obliquely toward the heel of the next preceding cutter.

2. In combination with the spiral flange B, beveling to a thin edge the cylinder at *d*, in front of the base of the prime cutter, for the purpose of giving an outward direction to and carrying away the cuttings, substantially as set forth.

In testimony whereof I have signed my name to this specification before two subscribing witnesses.

ARCALOUS WYCKOFF.

Witnesses:
GEO. W. WYCKOFF,
G. L. DAWES.